UNITED STATES PATENT OFFICE.

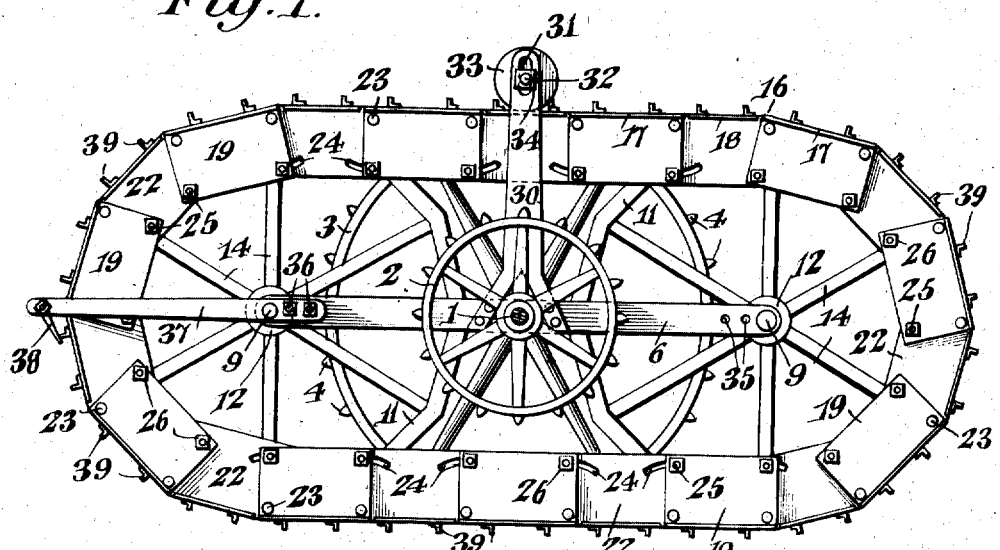
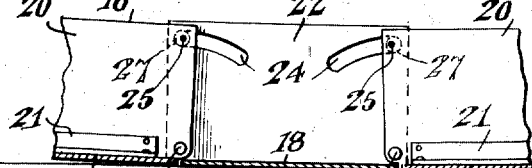
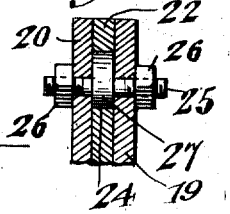
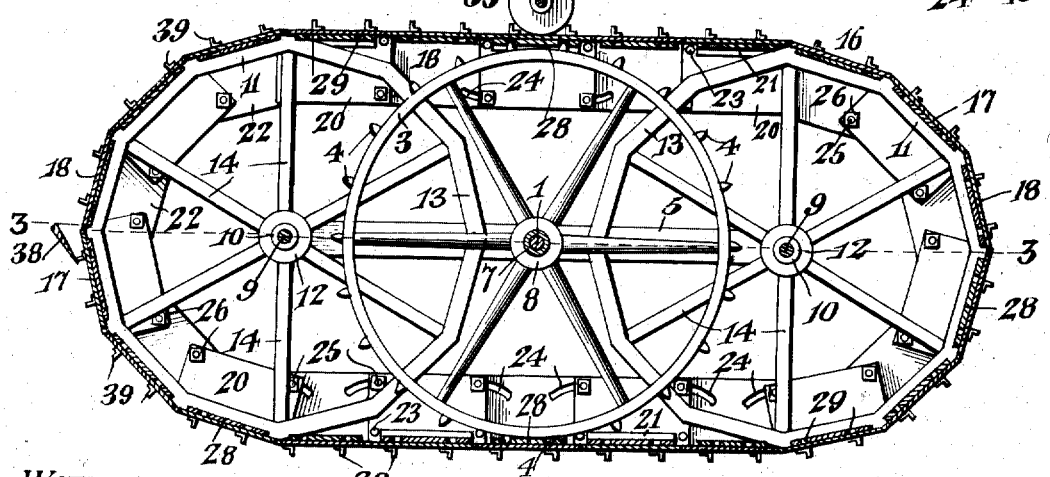

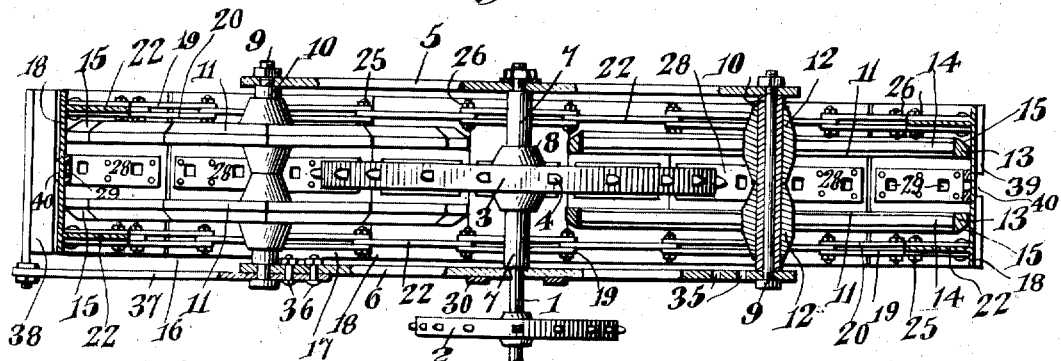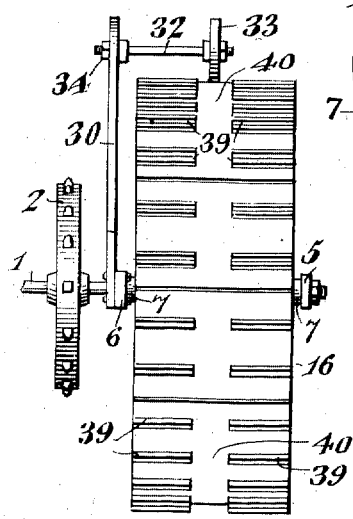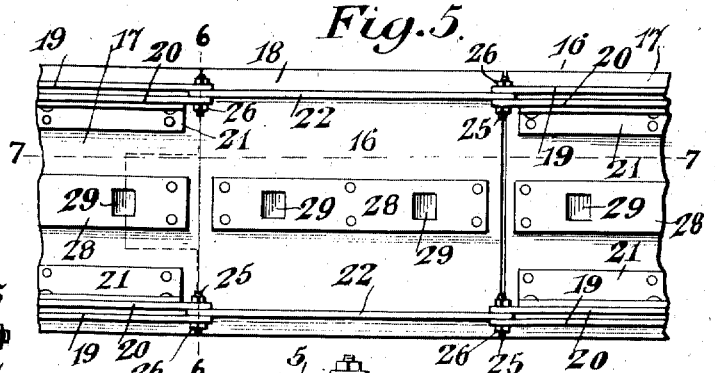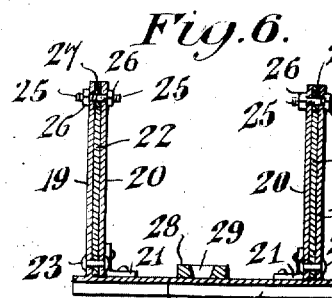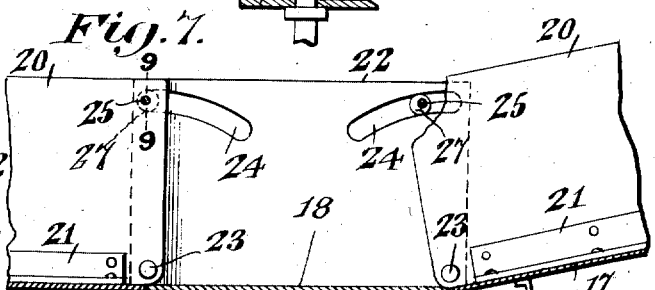

GEORGE W. JORY, OF MARYSVILLE, CALIFORNIA.

CATERPILLAR-TREAD FOR VEHICLES.

1,217,007.     Specification of Letters Patent.     Patented Feb. 20, 1917.

Application filed September 13, 1915. Serial No. 50,417.

*To all whom it may concern:*

Be it known that I, GEORGE W. JORY, a citizen of the United States, residing at Marysville, in the county of Yuba and State of California, have invented a new and useful Caterpillar-Tread for Vehicles, of which the following is a specification.

This invention has reference to a supporting tread for the wheels of vehicles of the type known as caterpillar tread, and its object is to provide a tread which despite elongation in the direction of travel provides a tread supporting means on the vehicle throughout practically the whole length of the ground engaging portion of the tread.

In accordance with the present invention, there is provided an elongated belt-like endless tread member composed of numerous sections hinged end to end and extending about supporting wheels spaced apart in the direction of travel. In addition to the supporting wheels there is provided an intermediate wheel connected to the terminal supporting wheels so that the three wheels have a fixed relation one to the other whereby the intermediate wheel serves as a backing or support for the ground run of the tread and the effectiveness of the tread is correspondingly extended. Furthermore the invention contemplates the utilization of the intermediate wheel as a power or driving wheel for the extended tread so that the invention may be employed on tractors with greatly increased efficiency over the customary circular tractor wheels. The invention also contemplates means whereby in the event of the use of the invention for traction purposes, the engagement of the driving member with the tread belt is increased.

The invention further contemplates the provision of means for removing clinging earth from the earth engaging surface of the tread and also contemplates a means for connecting the separate elements of the tractor belt in a manner to cause a slight convexity of the ground engaging face of the tractor belt or tread.

The invention will be best understood from a consideration of the following detailed description, taken in connection with the accompanying drawings forming a part of this specification, with the further understanding that while the drawings show a practical form of the invention, the latter is not confined to strict conformity with the showing of the drawings, but may be changed and modified so long as such changes and modifications mark no material departure from the salient features of the invention, as pointed out in the claims.

Figure 1 is a side elevation of a caterpillar tread structure, as viewed from the vehicle side, the shaft or axle being shown in cross section;

Fig. 2 is a longitudinal vertical section in part along the center line of the structure of Fig. 1, and showing some nearer parts in elevation;

Fig. 3 is a section on the line 3—3 of Fig. 2 with one end wheel and the central wheel in plan view;

Fig. 4 is an end elevation of the structure as seen from the right hand end of Fig. 1;

Fig. 5 is a plan view of a portion of the length of the tread belt drawn on a larger scale than the other figures;

Fig. 6 is a section on the line 6—6 of Fig. 5;

Fig. 7 is a section on the line 7—7 of Fig. 5;

Fig. 8 is a section similar to Fig. 7, but showing a somewhat different adjustment of the parts;

Fig. 9 is a detail section on the line 9—9 of Fig. 7, but drawn on a larger scale;

Fig. 10 is a detail section showing the arrangement of the parts to adapt the structure to an ordinary wagon axle.

Referring to the drawings, there is shown a shaft 1 which, as will hereinafter appear, may represent an axle or may represent a drive shaft, and in the various figures of the drawings, with the exception of Fig. 10, the shaft 1 will be considered as a drive shaft. In order that power may be applied to the shaft 1, it is shown in Figs. 1, 3 and 4 as carrying a sprocket wheel 2, which may be considered as fast to the wheel, so that power from some suitable prime mover may be applied to the shaft 1, for driving it. Of course, it will be understood that while for some purposes a sprocket drive is desirable, for other purposes the shaft 1 may be driven by power in some other manner quite common in the art.

Mounted on the shaft 1 is a wheel 3, which in the event of the shaft 1 being employed as a power shaft, is a toothed wheel, being shown in the drawings as provided with peripheral teeth 4. The shaft 1 traverses two side bars 5, 6 respectively about mid-way of the length of the bars. The bars 5 and 6 are spaced from the wheel 3 equal distances by spacing sleeves 7 applied to the shaft 1 between the hub of the wheel 3, which hub is indicated at 8, and the inner faces of the bars 5 and 6.

The corresponding ends of the bars 5 and 6 are connected together by bolts 9 traversing spacing sleeves 10 whereby the ends of one bar are maintained in spaced relation to the ends of the other bar by distances corresponding to the spacing of the bars where traversed by the shaft 1. On each sleeve 10 is a wheel 11 composed of two hubs 12 and two rims 13 joined to the respective hubs by spokes 14. The rims 13 are spaced apart sufficiently to admit of the passage of the peripheral portion of the wheel 3 between them. The hubs 12 may be secured together as one hub or may be separate as indicated in the drawings, but as each wheel 11 is an idler wheel in the operation of the structure and is so constructed that in its operation each rim 13 will maintain the proper relation with the companion rim 13, the hubs carrying the two rims may or may not be connected together. The periphery of the wheel 3 is circular while the peripheral portions or rims 13 of the wheels 11 are polygonal. In the installed position of the wheels 3 and 11, the rims 13 of one wheel 11 are in line with the corresponding rims 13 of the other wheel 11 in the direction of travel, while the rim of the wheel 3 is located between the pairs of rims 13 of the two wheels 11 and about mid-way thereof. Each rim 11 has its outer side beveled as shown at 15 to avoid liability of catching upon certain parts to be described.

Surrounding the wheels 3 and 11 is an endless tread belt 16 made up of a series of plates 17—18 alternating one with the other in the direction of the length of the tread belt. Each plate 17 has side flanges 19 at or near the edges and projecting at substantially right angles to the plane of the plate 17. On each plate 17 adjacent to each plate 19 but spaced from the latter in the direction toward the other side plate 18 is a plate 20 made fast to the plate 17 by angle strips 21. Each plate 18 has side plates 22 like the side plates 19, but so positioned as to enter between the plates 19 and the companion plates 20. The side plates 19, 20 and 22 are longer than the respective base plates 17 and 18 of each unit 16 so that the end portion of each side plate 22 may enter between and be overlapped by the corresponding plates 19 and 20. Adjacent to the base plates 17 and 18 the corresponding side plates 19, 20 and 22 are connected by pivots 23, which may be in the form of either rivets as shown or in any other suitable form. Each plate 22 is provided near the edge remote from the plate 18 with curved slots 24 beginning near the corner of the plate and curving in a direction toward each other and toward the center of the plate 18 upon an arc the center of which coincides with the longitudinal axis of the pivot 23 joining the plates 19, 20 and 22.

Traversing the slots 24 and the corresponding portions of the plates 19 and 20 near the corners of the latter remote from the pivots 23 are bolts 25 threaded at each end to receive a nut 26 and at an intermediate point provided with a collar 27 eccentric with the longitudinal axis of the bolt. Each collar 27 is adapted to a slot 24, while the threaded portions of the bolt traverse the respective plates 19 and 20 and receive the nuts 26 so that the collars 27 will travel along the slots 24 and limit the turning movement of one belt unit upon the other about the pivot 23.

The slots 24 are each of such length and so positioned that when adjacent plates 17 and 18 are in one plane the collars 27 abut the outer ends of the respective slots 24 provided the collars have been turned so that the shanks of the bolts are closer to the said ends of the slots than the center of the collar. If the bolts 25 be turned so that the centers of the eccentric collars are brought closer to the outer ends of the slots than before, the movement of the plates 17 and 18 about the pivots 23 is correspondingly limited and the plates 17 and 18 are no longer in one plane but are at a slight angle one to the other. In this way the straight runs of the traction belt between the wheels 11 may be made to be slightly convex in general arrangement, thus contributing to the tractive effect of the belt upon the ground, especially where the latter is a little soft.

Secured in the mid line of each plate 17 and 18 is a strip 28 with sockets 29 therein spaced one from the other by distances corresponding to the spacing of the teeth 4 of the wheel 3. The strips 28 are individual to the respective plates 17, and 18, so as to offer no impediment to the passage of the traction belt about the wheels 11. The peripheries of the treads 13 of the wheels 11 have their polygonal faces corresponding to the lengths of the plates 17 and 18, while the beveled edges 15 of the rims 13 are in noninterfering relation with the angle members 21.

One of the side strips, say the strip 6 has a post 30 secured to and rising therefrom above the upper run of the traction belt and the post is there provided with a longitudinal slot 31 traversed by a spindle 32 carrying a roller 33 designed to bear upon the upper run of the belt 16. The spindle 32 is suitably threaded to receive a nut 34 by means of which the spindle may be clamped to the post at any point along the slot 31. The purpose of the roller 33 is to hold the upper run of the belt against the periphery of the wheel 3 especially when the wheel is a toothed wheel and is utilized for tractive purposes. Near each end of one of the side strips, say strip 6, the latter is provided with holes 35 through which bolts 36 may be passed in traversing relation to an arm 37 of a length to extend beyond one end of the other of the traction devices and there the arm 37 carries a scraper blade 38 in position to remove accumulated mud or dirt from the outer surface of the belt. Where the device is used for traction purposes, each plate 17 and 18 has its ground engaging face provided with ribs 39 which in the event of the use of the hold-down roller 34 extend but part way across the plate leaving a central clear peripheral space 40 free from the ribs so as to be out of the path of the roller 33. If the roller 33 is not used, then the ribs may extend all the way across the plates 17 and 18 as indicated at 39ᵃ in Fig. 6.

When the caterpillar tread is not desired for traction purposes, but for tread purposes only, then it may be mounted upon a vehicle having a tapered axle spindle 1ᵃ, as indicated in Fig. 10, in which case the spindle is surrounded by a sleeve 7ᵃ having a tapering bore to fit the axle spindle 1ᵃ. Otherwise the structure may be the same as has been described with reference to the other figures, except for the omission of such parts as may be made unnecessary by the omission of the traction function of the device. While the elements of the tread belt represented by the plates 17 and 18 are shown as of substantially sheet form, it will be understood that they may be otherwise constructed after the practice frequently employed in the production of extended treads, since often-times the treads are made thicker than is shown.

It will be understood that the invention is not limited to the use of one intermediate wheel for in long tread structures more wheels may be used. Furthermore in short treads where power is not used to drive the tread the intermediate wheel may be omitted.

Instead of applying power to the wheel 3 to drive the tread structure, power may be taken from the wheel 3 to actuate machinery, such as binding machinery for instance, carried by the vehicle supported in part by the caterpillar treads which latter may therefore take the place of the drive wheel on a binder, harvester, or the like.

It will be further understood that the scraper blade 38 may be supported at both ends instead of one end.

What is claimed is:—

1. A caterpillar tread for vehicles comprising an endless tread belt, supporting wheels for the belt spaced apart in the direction of the length of the belt and each composed of two axially spaced rims, an intermediately located wheel having its rim entering between the rims of the first-named wheels, and connecting bars for the axial portions of all the wheels on both sides thereof, the axial portion of the intermediate wheel constituting the sole part of the caterpillar tread connected to the vehicle.

2. A caterpillar tread for vehicles comprising an endless tread belt with an endless series of sockets along its longitudinal center line, and said belt being made up of a series of connected tread plates, end wheels spaced apart in the direction of the length of the belt and each composed of two rims axially spaced apart and of polygonal contour to engage the tread plates on opposite sides of the longitudinal center line thereof, and an intermediately located sprocket wheel having teeth for engaging the sockets in the belt and having a peripheral portion entering between the axially spaced peripheral portions of the end wheels, the intermediate wheel constituting the sole part of the caterpillar tread connected to the vehicle.

3. In a caterpillar tread for vehicles, an endless tread belt comprising a series of double and single walled channel members in alternation pivoted together adjacent to the tread portion of the belt and with the single walls telescoping between the double walls of the neighboring channel members, the single walls being provided with slots curved on axes coinciding with the pivot connections and the double walls being joined by connections traversing the slots and serving to unite the portions of the side walls of the channel members remote from the tread portions of the channel members.

4. In a caterpillar tread for vehicles, an endless tread belt comprising a series of double and single walled channel members in alternation pivoted together adjacent to the tread portion of the belt and with the single walls telescoping between the double walls of the neighboring channel members, the single walls being provided with slots curved on axes coinciding with the pivot connections and the double walls being joined by connections traversing the slots and serving to unite the portions of the side walls of the channel members remote from the tread portions of the channel members, the last-named connections having means for varying the effective lengths of the slots, whereby the tread portion of the belt may move in a straight path or may be caused to move in a curved path.

5. A caterpillar tread for vehicles comprising an endless tread belt composed of a connected series of units each of channel form with alternate units having double-walled sides and the other units having single-walled sides telescoping in the double-walled sides, carrying wheels for the belt spaced apart in the direction of travel and each composed of wheel members spaced apart axially and engaging the belt elements on opposite sides of the longitudinal center line of the belt, and an intermediately located wheel constituting a backing member for the runs of the belt extending between the carrying wheels and entering between the axially spaced wheel elements of the first named wheel, the last named wheel being provided with peripheral sprocket teeth and the belt elements having sprocket members engaged by the sprocket teeth and located in the longitudinal center line of the belt.

6. A caterpillar tread for vehicles comprising an endless tread belt composed of a series of pivotally connected units, spaced carrying wheels for the belt with means for holding the wheels in spaced relation to sustain the belt in an elongated condition, a toothed wheel intermediate of the first named wheels and constituting a backing member for the runs of the belt between the first named wheels, and engaging means for holding the first named wheels in spaced relation whereby the second named wheel is held in its intermediate position, and means carried by the spacing means for over-running the upper run of the belt to hold it against the second named wheel.

7. A caterpillar tread for vehicles comprising an endless tread belt composed of a series of pivotally connected units, spaced carrying wheels for the belt with means for holding the wheels in spaced relation to sustain the belt in an elongated condition, a toothed wheel intermediate of the first named wheels and constituting a backing member for the runs of the belt between the first named wheels and engaging the means for holding the first named wheels in spaced relation whereby the second named wheel is held in its intermediate position, and means carried by the spacing means for over-running the upper run of the belt to hold it against the second named wheel, said second named wheel and the belt having coacting means whereby the belt may be driven by power applied to the second named wheel.

8. A caterpillar tread for vehicles comprising an endless belt composed of a series of pivotally connected tread elements, carrying wheels for the belt spaced apart in the direction of travel to elongate the belt, elongated bars carried by and in which the wheels are journaled and constituting means for holding the wheels in the spaced relation, another wheel journaled in the bars and located intermediately of the first named wheels, a post erected on one of the bars and a presser roller carried by the post in over-running relation to the upper run of the belt, said second named wheel being of a diameter to constitute a backing support for the runs of the belt extending between the first named wheels.

9. A caterpillar tread for vehicles comprising an endless belt composed of a series of pivotally connected tread elements, carrying wheels for the belt spaced apart in the direction of travel to elongate the belt, elongated bars carried by and in which the wheels are journaled and constituting means for holding the wheels in the spaced relation, another wheel journaled in the bars and located intermediately of the first named wheels, a post erected on one of the bars and a presser roller carried by the post in over-running relation to the upper run of the belt, said second named wheel being of a diameter to constitute a backing support for the runs of the belt extending between the first named wheels, and the second named wheel and the belt having sprocket connections for driving the belt by power applied to the second named wheel.

10. A caterpillar tread for vehicles comprising an endless tread belt composed of traction units pivotally connected together, carrying wheels for the belt spaced apart for maintaining the belt elongated in the direction of travel, bars connecting the carrying wheels and maintaining them in the spaced condition, and a scraper for the traction belt comprising an arm with means for securing it to either end of one of the bars and a blade in position to remove adherent matter from the tread portion of the belt.

11. In a caterpillar tread for vehicles, an endless tread belt consisting of a series of channel units with tread portions and side plates pivoted together adjacent to the tread portions and with the side plates of one element in sliding engagement with the slide plates of the next adjacent element, each alternate element having its side plates provided with slots curved about the axis of the pivot connection, and connecting bolts traversing the slots and within the slots provided with eccentric portions whereby the travel of the belt units toward alined position may be stopped short of such alined position or may continue to the alined position in accordance with the adjustment of the bolts.

In testimony, that I claim the foregoing as my own I have hereto affixed my signature in the presence of two witnesses.

GEORGE W. JORY.

Witnesses:
  R. W. McCormick,
  H. M. Marcuse.